United States Patent
Gao et al.

(10) Patent No.: US 12,352,647 B2
(45) Date of Patent: Jul. 8, 2025

(54) MEASURING DEVICE AND METHOD FOR DYNAMIC CHARACTERISTICS OF PRESSURE SENSITIVE PAINT

(71) Applicant: NORTHWESTERN POLYTECHNICAL UNIVERSITY, Shaanxi (CN)

(72) Inventors: Limin Gao, Shaanxi (CN); Ning Ge, Shaanxi (CN); Xiangfu Lei, Shaanxi (CN); Lei Wang, Shaanxi (CN); Bo Ouyang, Shaanxi (CN)

(73) Assignee: NORTHWESTERN POLYTECHNICAL UNIVERSITY, Shaanxi (CN)

( * ) Notice: Subject to any disclaimer, the term of this patent is extended or adjusted under 35 U.S.C. 154(b) by 349 days.

(21) Appl. No.: 18/181,574

(22) Filed: Mar. 10, 2023

(65) Prior Publication Data
US 2024/0118159 A1   Apr. 11, 2024

(30) Foreign Application Priority Data
Oct. 9, 2022   (CN) .......................... 202211226912.1

(51) Int. Cl.
| | |
|---|---|
| *G01L 25/00* | (2006.01) |
| *G01L 1/24* | (2006.01) |
| *G01N 21/01* | (2006.01) |
| *G01N 21/71* | (2006.01) |
| *G01N 21/84* | (2006.01) |
| *G01L 19/00* | (2006.01) |

(52) U.S. Cl.
CPC ................ *G01L 25/00* (2013.01); *G01L 1/24* (2013.01); *G01N 21/01* (2013.01); *G01N 21/71* (2013.01); *G01N 21/8422* (2013.01); *G01L 19/0092* (2013.01); *G01N 2021/8427* (2013.01)

(58) Field of Classification Search
CPC ....... G01L 25/00; G01L 1/24; G01L 19/0092; G01N 21/01; G01N 21/71; G01N 21/8422; G01N 2021/8427
USPC .......................................................... 73/866
See application file for complete search history.

(56) References Cited

U.S. PATENT DOCUMENTS

2020/0348201 A1* 11/2020 Gao ..................... G01L 11/02

FOREIGN PATENT DOCUMENTS

CN            112304493 A  *  2/2021  ............ G01J 3/2803

* cited by examiner

*Primary Examiner* — Benjamin R Schmitt
(74) *Attorney, Agent, or Firm* — JCIPRNET

(57) ABSTRACT

The disclosure discloses a measuring device for dynamic characteristics of pressure sensitive paint, including a PSP sample wafer, a dynamic pressure sensor, an oscilloscope, a light source, a photomultiplier tube, a bandpass filter, a loudspeaker, a power amplifier, and a signal generator. The disclosure further discloses a measuring method for dynamic characteristics of pressure sensitive paint. The disclosure has the following beneficial effects: by using the measuring device disclosed by the present disclosure, the continuous sinusoidal pressure wave with any frequency can be generated, and has the frequency precision that does not exceed 0.01 Hz, an optical path is not shielded, high stability is achieved, and the amplitude and phase characteristics of the pressure frequency of the PSP can be precisely captured.

10 Claims, 1 Drawing Sheet

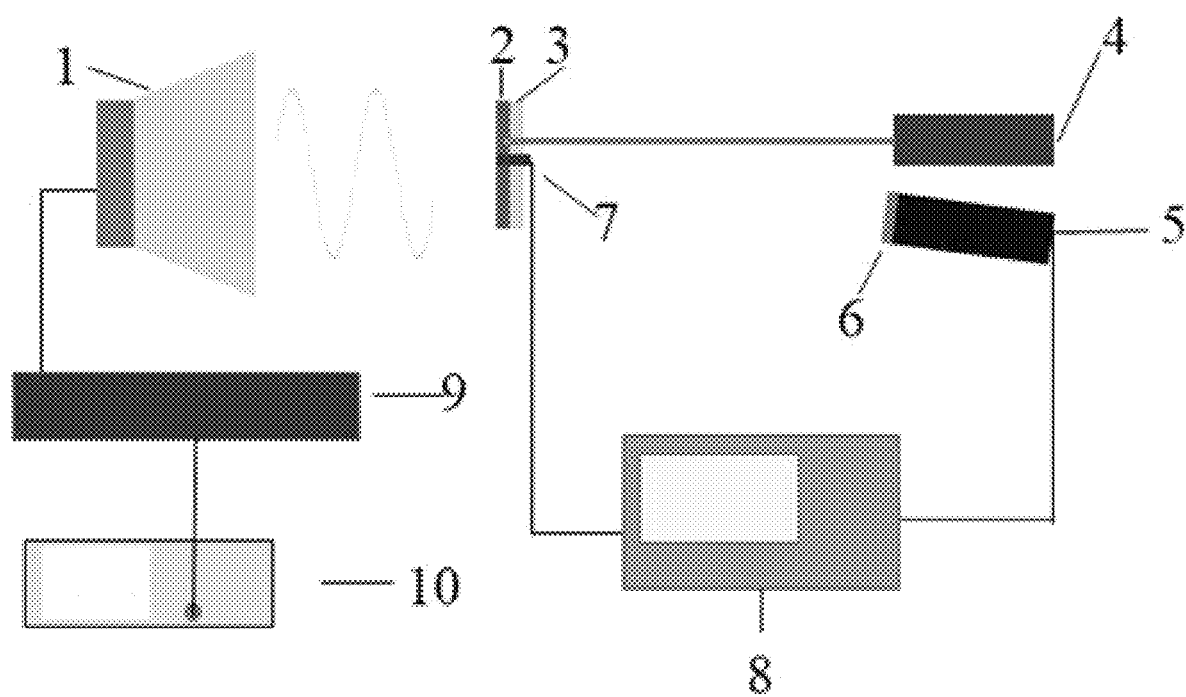

MEASURING DEVICE AND METHOD FOR DYNAMIC CHARACTERISTICS OF PRESSURE SENSITIVE PAINT

CROSS-REFERENCE TO RELATED APPLICATION

This application claims the priority benefit of China application no. 202211226912.1, filed on Oct. 9, 2022. The entirety of the above-mentioned patent application is hereby incorporated by reference and made a part of this specification.

FIELD

The present disclosure relates to the technical field of instruments and apparatuses, in particular to a measuring device and method for dynamic characteristics of pressure sensitive paint.

BACKGROUND

As one of three thermotechnical parameters (pressure, temperature and flow) of automatic control, the pressure plays a very important role in measurement and control. The research on pressure measurement with PSP (Pressure Sensitive Paint) based on computer vision and image processing technologies is an important breakthrough in a non-contact flow display technology. Compared with the current domestic traditional dot matrix measurement technology, the pressure measurement with PSP can make up the damage to the model and the interference to flow fields caused by hole arrangement of pressure probes, a pressure sensor, or the like, and the complexity of the traditional data transmission method. Moreover, this measurement can greatly widen the measurement range, and has the advantages of no contact, continuous measurement, relatively low experimental cost and time saving, which is popular to the majority of experimental workers.

The basic principle of the pressure measurement with PSP is as follows: PSP uniformly covers a surface of a measured model, and PSP includes photosensitive molecules and an oxygen-permeable substrate. When being excited by light with a specific wavelength, the photosensitive molecules in the paint get energy from the originally stable ground state so as to be transitioned to a high-energy excited state. The photosensitive molecules in the unstable excited state are impacted by the oxygen molecules diffused from the measured surface to lose the energy in the excited state so as to be deactivated to return to the ground state, and no radiant light is generated in this process, so that the luminous intensity is lowered, resulting in an "oxygen quenching" phenomenon. The higher the concentration of the oxygen molecules, i.e., the higher the pressure in the atmosphere, the stronger the oxygen quenching effect, and the darker the light emitted by the paint under the irradiation of certain light. Therefore, under the irradiation of the light, the luminous intensity of the PSP can reflect a value of the pressure on the surface of the measured model. An image on the surface of the measured model is shot under the irradiation of the light, and by analyzing the shot image, pressure distribution on the surface of the measured model can be obtained, and a new thought is also provided for measuring the pressure distribution on the surface of a rotating model.

With the progress of a preparation process for the PSP, the measurement with PSP has been expanded from stable-state measurement to dynamic measurement. Dynamic characteristics of the PSP are important indexes for evaluating a dynamic range of the PSP adapting to a flow field, and are necessary prerequisites for dynamic measurement with the PSP. The current measuring device for the dynamic characteristics of the PSP mainly includes an fluid oscillator, a shock tube and an acoustic standing wave tube. The fluid oscillator not only requires the continuous supply of a high-pressure airflow, also, the pulsating airflow generated by an oscillator is not a standard sinusoidal wave, and therefore, it is difficult to guarantee the pressure stability. The shock tube is based on a principle that air in the tube is continuously compressed, and the air pressure will break a film when being high enough, so that a pressure wave shocks a PSP sample wafer; and the response time of the paint is estimated according to the pressure rise time of the PSP. However, such a device cannot measure the amplitude frequency characteristics and phase frequency characteristics of the continuously-changed pressure. The acoustic standing wave tube makes up the defects of the shock tube and can generate the continuous sinusoidal pressure. However, due to the formation principle of standing waves, the length (which is usually longer than 1 m) of the acoustic standing wave tube has to be increased when the pressure wave with a relatively low frequency is generated. There will be pressure loss in the process that the pressure wave generated by a loudspeaker passes through a long tube and reaches the other end of the tube, and the waves reflected by the wall of the tube will result in that the pressure waves reaching the surface of the PSP include a part of multiplied-frequency pressure or other-frequency pressure. More importantly, the acoustic standing wave tube can only perform measurement at a multiplied frequency of a fundamental frequency. It is assumed that the fundamental frequency of the acoustic standing wave tube is 100 Hz, the acoustic standing wave tube emits pressure waves which are 100 Hz, 200 Hz, 300 Hz . . . , the measured frequency precision is equal to the fundamental frequency of the acoustic standing wave tube, and thus, the amplitude and phase characteristics of the pressure frequency of the PSP cannot be precisely captured.

Therefore, it is necessary to design a set of measuring device for dynamic characteristics of pressure sensitive paint to achieve high-frequency precision measurement for the amplitude frequency characteristic and the phase frequency characteristic of the PSP.

SUMMARY

The present disclosure aims at overcoming defects in the prior art to provide a measuring device and method for dynamic characteristics of a pressure sensitive paint.

The present disclosure adopts the technical solutions as follows: provided is a measuring device for dynamic characteristics of pressure sensitive paint (PSP), including a PSP sample wafer, a dynamic pressure sensor, an oscilloscope, a light source, a photomultiplier tube, a bandpass filter, a loudspeaker, a power amplifier, and a signal generator. An outer surface of the PSP sample wafer is sprayed with PSP. The dynamic pressure sensor is mounted at the center of the PSP sample wafer, and an output end of the dynamic pressure sensor is connected to an input end of the oscilloscope. An emitting end of the light source directly faces an inner surface of the PSP sample wafer. A detection end of the photomultiplier tube is provided with the bandpass filter, and an output end of the photomultiplier tube is connected to the input end of the oscilloscope. The loudspeaker directly faces the outer surface of the PSP sample wafer. The loudspeaker, the power amplifier and the signal generator are connected in sequence.

According to the above-mentioned solution, the PSP sample wafer includes an optical glass sheet. An outer surface of the optical glass sheet is sprayed with the PSP. Light emitted by the PSP and the light source can pass through the optical glass sheet.

According to the above-mentioned solution, the optical glass sheet is provided with a central hole, the dynamic pressure sensor is mounted in the central hole, and the output end of the dynamic pressure sensor extends out from the central hole to be electrically connected to the input end of the oscilloscope.

According to the above-mentioned solution, the light source is a spot laser source.

According to the above-mentioned solution, a wavelength of light emitted by the light source is consistent with an excitation wavelength of the PSP.

According to the above-mentioned solution, the bandpass filter only allows a light emitting waveband of the PSP to pass and prevents ambient light and light emitted by the light source from entering the photomultiplier tube.

According to the above-mentioned solution, an optical detection frequency range of the photomultiplier tube covers the maximum response frequency of the PSP.

According to the above-mentioned solution, signals detected by the photomultiplier tube and the dynamic pressure sensor are synchronously recorded by the oscilloscope.

According to the above-mentioned solution, the loudspeaker directly faces the outer surface of the PSP sample wafer and sends a pressure wave to the outer surface of the PSP sample wafer, and a range of the pressure wave covers the PSP sample wafer.

The present disclosure further employs a measuring method for dynamic characteristics of PSP, wherein the method includes the following steps:
step 1, providing the above-mentioned measuring device;
step 2, turning on the light source, and irradiating light emitted by the light source on PSP after transmitting through the optical glass sheet so that the PSP emits light;
step 3, turning on the signal generator and the loudspeaker, generating a sinusoidal wave electrical signal with a lower frequency Fref by the signal generator, sending the sinusoidal wave electrical signal to the loudspeaker after the sinusoidal wave electrical signal is amplified by the power amplifier so that a pressure wave with the same frequency is generated;
step 4, acquiring a fluctuant light emitting signal of the PSP by the photomultiplier tube, synchronously acquiring a fluctuant pressure signal of the PSP by the dynamic pressure sensor, measuring an amplitude Iref of the light emitting signal and an amplitude Pref of the pressure signal of the PSP by the oscilloscope, and calculating a phase difference Vref according to waveforms of the two signals;
step 5, adjusting a frequency of the signal generator at a step length of 1 Hz to enable the loudspeaker to generate a sinusoidal pressure wave with a frequency Fi, and adjusting the power amplifier to enable the amplitude of the pressure signal generated by the loudspeaker to still be Pref; measuring an amplitude Ii and a phase difference Vi of the light emitting signal of the PSP at the moment by the oscilloscope; and
step 6, repeatedly performing step 5, marking the corresponding frequency as a cut-off frequency of the PSP when the amplitude Ii is reduced to a half of Iref; and marking the corresponding frequency as the maximum frequency of the PSP when the amplitude Ii approaches to 0, wherein the phase difference of the corresponding frequencies is Vi-Vref.

The present disclosure has the beneficial effects that, by using the measuring device disclosed by the present disclosure, the continuous sinusoidal pressure wave with any frequency can be generated, the frequency precision does not exceed 0.01 Hz, an optical path is not shielded, high stability is achieved, and the amplitude and phase characteristics of the pressure frequency of the PSP can be precisely captured. The measuring device is simple in structure, and the required equipment is a commonly-used instrument which does not need to be customized. The measuring distance is short, the space is saved, and the pressure loss in the process is reduced.

BRIEF DESCRIPTION OF THE DRAWINGS

FIGURE is an overall structural schematic diagram of a specific embodiment of the present disclosure.

1, loudspeaker; 2, PSP; 3, optical glass; 4, light source; 5, photomultiplier tube; 6, bandpass filter; 7, dynamic pressure sensor; 8, oscilloscope; 9, power amplifier; and 10, signal generator.

DETAILED DESCRIPTION OF THE EMBODIMENTS

In order to better understand the present disclosure, the present disclosure will be further described below in conjunction with accompanying drawings and specific embodiments.

As shown in FIGURE, a measuring device for dynamic characteristics of a pressure sensitive paint includes a PSP sample wafer, a dynamic pressure sensor 7, an oscilloscope 8, a light source 4, a photomultiplier tube 5, a bandpass filter 6, a loudspeaker 1, a power amplifier 9, and a signal generator 10. An outer surface of the PSP sample wafer is sprayed with PSP 2. The dynamic pressure sensor 7 is mounted at the center of the PSP sample wafer, and an output end of the dynamic pressure sensor 7 is connected to an input end of the oscilloscope 8. An emitting end of the light source 4 directly faces an inner surface of the PSP sample wafer. A detection end of the photomultiplier tube 5 is provided with the bandpass filter 6, and an output end of the photomultiplier tube 5 is connected to the input end of the oscilloscope 8. The loudspeaker 1 directly faces the outer surface of the PSP sample wafer. The loudspeaker 1, the power amplifier 9 and the signal generator 10 are connected in sequence.

Preferably, the PSP sample wafer includes an optical glass 3 sheet. An outer surface of the optical glass 3 sheet is sprayed with the PSP 2. Light emitted by the PSP 2 and the light source 4 can pass through the optical glass 3 sheet.

Preferably, the optical glass 3 sheet is provided with a central hole, the dynamic pressure sensor 7 is mounted in the central hole, and the output end of the dynamic pressure sensor 7 extends out from the central hole to be electrically connected to the input end of the oscilloscope 8.

In the present disclosure, the dynamic pressure sensor 7 is used for detecting a dynamic pressure of the PSP 2 on the PSP sample wafer. In order to reduce optical path shielding and measuring errors, the head size of the dynamic pressure sensor 7 is as small as possible. In order to cover the possible maximum response frequency of the PSP 2, a pressure frequency range that can be detected the dynamic pressure sensor 7 may be as large as possible.

Preferably, the light source 4 is a spot laser source, and a wavelength of light emitted by the light source 4 is consistent with an excitation wavelength of the PSP 2, so that the optical power stability is required to be good enough.

Preferably, the bandpass filter 6 only allows a light emitting waveband of the PSP 2 to pass and prevents ambient light and light emitted by the light source 4 from entering the photomultiplier tube 5.

Preferably, an optical detection frequency range of the photomultiplier tube 5 covers the maximum response frequency of the PSP 2.

Preferably, signals detected by the photomultiplier tube 5 and the dynamic pressure sensor 7 are synchronously recorded by the oscilloscope 8.

Preferably, the loudspeaker 1 directly faces the outer surface (i.e., a surface sprayed with the PSP 2) of the PSP sample wafer and sends a pressure wave to the outer surface of the PSP sample wafer, wherein the range of the pressure wave covers the PSP sample wafer. In the present disclosure, in order to reduce the loss of the pressure wave capacity, the distance between the PSP sample wafer and the loudspeaker 1 needs to be as small as possible, which may be 5 cm to 10 cm.

In the present disclosure, the signal generator 10 generates a sinusoidal signal, and the sinusoidal signal is amplified by the power amplifier 9 and is transmitted to the loudspeaker 1, so that the loudspeaker 1 emits a sinusoidal pressure wave with a specific frequency, and the amplitude and frequency of the pressure signal generated by the loudspeaker 1 are as high as possible.

A measuring method for dynamic characteristics of PSP includes the following steps:

step 1, the above-mentioned measuring device is provided to ensure that a measuring environment is a black environment, without stray light;

step 2, the light source 4 is turned on, and light emitted by the light source 4 is irradiated on PSP 2 after being transmitted through the optical glass 3 sheet so that the PSP 2 emits light;

step 3, the signal generator 10 and the loudspeaker 1 are turned on, the signal generator 10 generates a sinusoidal wave electrical signal with a reference frequency Fref=10 Hz, the sinusoidal wave electrical signal is sent to the loudspeaker 1 after being amplified by the power amplifier 9 so that a pressure wave with the same frequency is emitted;

step 4, the photomultiplier tube 5 acquires a fluctuant light emitting signal of the PSP 2, the dynamic pressure sensor 7 synchronously acquires a fluctuant pressure signal of the PSP 2, the oscilloscope 8 measures an amplitude Iref of the light emitting signal and an amplitude Pref of the pressure signal of the PSP 2, and a phase difference Vref is calculated according to waveforms of the two signals;

step 5, a frequency of the signal generator 10 is adjusted at a step length of 1 Hz to enable the loudspeaker 1 to generate a sinusoidal pressure wave with a frequency Fi, and the power amplifier 9 is adjusted to enable the amplitude of the pressure signal generated by the loudspeaker 1 to still be Pref; the oscilloscope 8 measures an amplitude Ii and a phase difference Vi of the light emitting signal of the PSP 2 at the moment; and step 6, step 5 is repeatedly performed, when the amplitude Ii is reduced to a half of Iref, the corresponding frequency is marked as a cut-off frequency of the PSP 2; and when the amplitude Ii approaches to 0, the corresponding frequency is marked as the maximum frequency of the PSP 2, wherein the phase difference of the corresponding frequencies is Vi-Vref.

The contents which are not described in detail in the present specification belong to the prior art known to those skilled in the art. Finally, it should be noted that the above-mentioned embodiments are merely preferred embodiments of the present disclosure, but are not intended to limit the present disclosure. Although the present disclosure has been described in detail with reference to the embodiments, those skilled in the art may still modify the technical solutions recorded in the respective foregoing embodiments or equivalently substitute parts of technical features therein. Any modifications, equivalent substitutions, improvements, etc., made within the spirit and principle of the present disclosure shall fall within the protection scope of the present disclosure.

What is claimed is:

1. A measuring device for dynamic characteristics of pressure sensitive paint (PSP), comprising a PSP sample wafer, a dynamic pressure sensor, an oscilloscope, a light source, a photomultiplier tube, a bandpass filter, a loudspeaker, a power amplifier, and a signal generator, wherein an outer surface of the PSP sample wafer is sprayed with a PSP; the dynamic pressure sensor is mounted at a center of the PSP sample wafer, and an output end of the dynamic pressure sensor is connected to an input end of the oscilloscope; an emitting end of the light source directly faces an inner surface of the PSP sample wafer; a detection end of the photomultiplier tube is provided with the bandpass filter, and an output end of the photomultiplier tube is connected to the input end of the oscilloscope; and the loudspeaker directly faces the outer surface of the PSP sample wafer; and the loudspeaker, the power amplifier and the signal generator are connected in sequence.

2. The measuring device for dynamic characteristics of the PSP according to claim 1, wherein the PSP sample wafer comprises an optical glass sheet, and an outer surface of the optical glass sheet is sprayed with the PSP; and lights emitted by the PSP and the light source are capable of passing through the optical glass sheet.

3. The measuring device for dynamic characteristics of the PSP according to claim 2, wherein the optical glass sheet is provided with a central hole, the dynamic pressure sensor is mounted in the central hole, and the output end of the dynamic pressure sensor extends out from the central hole to be electrically connected to the input end of the oscilloscope.

4. The measuring device for dynamic characteristics of the PSP according to claim 2, wherein the light source is a spot laser source.

5. The measuring device for dynamic characteristics of the PSP according to claim 4, wherein a wavelength of light emitted by the light source is consistent with an excitation wavelength of the PSP.

6. The measuring device for dynamic characteristics of the PSP according to claim 2, wherein the bandpass filter only allows a light emitting waveband of the PSP to pass and prevents ambient light and light emitted by the light source from entering the photomultiplier tube.

7. The measuring device for dynamic characteristics of the PSP according to claim 1, wherein an optical detection frequency range of the photomultiplier tube covers a maximum response frequency of the PSP.

8. The measuring device for dynamic characteristics of the PSP according to claim 1, wherein signals detected by the photomultiplier tube and the dynamic pressure sensor are synchronously recorded by the oscilloscope.

9. The measuring device for dynamic characteristics of the PSP according to claim 1, wherein the loudspeaker directly faces the outer surface of the PSP sample wafer and sends a pressure wave to the outer surface of the PSP sample wafer, and a range of the pressure wave covers the PSP sample wafer.

10. A measuring method for dynamic characteristics of PSP, wherein the method comprises the following steps:
   step 1, providing the measuring device according to claim 1;
   step 2, turning on the light source, and irradiating a light emitted by the light source on the PSP after transmitting through the optical glass sheet so that the PSP emits light;
   step 3, turning on the signal generator and the loudspeaker, generating a sinusoidal wave electrical signal with a lower frequency Fref by the signal generator, sending the sinusoidal wave electrical signal to the loudspeaker after the sinusoidal wave electrical signal is amplified by the power amplifier so that a pressure wave with the same frequency is emitted;
   step 4, acquiring a fluctuant light emitting signal of the PSP by the photomultiplier tube, synchronously acquiring a fluctuant pressure signal of the PSP by the dynamic pressure sensor, measuring an amplitude Iref of the light emitting signal and an amplitude Pref of the pressure signal of the PSP by the oscilloscope, and calculating a phase difference Vref according to waveforms of the two signals;
   step 5, adjusting a frequency of the signal generator at a step length of 1 Hz to enable the loudspeaker to generate a sinusoidal pressure wave with a frequency Fi, and adjusting the power amplifier to enable the amplitude of the pressure signal generated by the loudspeaker to still be Pref; measuring an amplitude Ii and a phase difference Vi of the light emitting signal of the PSP at the moment by the oscilloscope; and
   step 6, repeatedly performing step 5, marking a corresponding frequency as a cut-off frequency of the PSP when the amplitude Ii is reduced to a half of Iref; and marking a corresponding frequency as a maximum frequency of the PSP when the amplitude Ii approaches to 0, wherein a phase difference of the corresponding frequencies is Vi-Vref.

* * * * *